Oct. 5, 1965   E. TÖNNIES   3,209,612
CONTROL ASSEMBLY
Filed Sept. 26, 1961   2 Sheets-Sheet 1

EDUARD TÖNNIES
INVENTOR.

BY Mestern, Ross + Mestern 3,209,612
CONTROL ASSEMBLY
Eduard Tönnies, Hamburg-Rissen, Germany, assignor to Hamburger Flugzeugbau Gesellschaft mit beschrankter Haftung, Hamburg-Finkenwerder, Germany
Filed Sept. 26, 1961, Ser. No. 140,733
Claims priority, application Germany, Sept. 30, 1960, H 40,558
6 Claims. (Cl. 74—471)

The present invention relates to a reciprocating control column of the type having two nested elongated members including a tubular outer member which is longitudinally displaceable, for adjusting a load such as the elevator surfaces of an aircraft, and a preferably coaxial inner member rotatable within the outer member for controlling the setting of another load such as the ailerons of the craft.

In this type of construction the rotary motion of the inner member tends to be transmitted to the surrounding tube. In certain prior systems, in which the longitudinal motion of the control column is transmitted to the elevator controls by a rack-and-pinion arrangement, the rack and the pinion as also the guides for the outer tube must be exactly aligned and any rotation of this tube relative to its support must be prevented. The conventional method of preventing this rotation is to design the tube with a non-circular cross-section and to provide appropriately shaped non-circular guides.

Tubes of such configuration are expensive and complicated to manufacture because of the non-standard shapes required. Moreover, even a very slight angular motion, due for example to wear or elastic deformation, can lead to jamming of rack-and-pinion drives or similar transmissions serving to couple the reciprocatory column to a rotary shaft.

It is, therefore, an object of my invention to provide a control column of the general type referred to in which the disadvantages set out above are avoided.

A more particular object of this invention is to provide means for making an associated rack-and-pinion drive or equivalent coupling mechanism substantially independent of the anguar position of the outer tube of the control column.

Another object of the instant invention is to provide a control-column assembly which is easy to install and whose parts can be cheaply manufactured on a mass-production basis.

The foregoing objects are realized, in accordance with my present invention, by the provision of a scissor linkage comprising two hingedly interconnected arms, the first arm being pivotally connected to the outer tube of the control column while the second arm has a fixed fulcrum on some part rigid with the frame of the aircraft, preferably the pillow block slidably supporting the column. Since each arm of this linkage is swingable in only one plane, generally an axial plane of the column, the outer tube is held against rotation by its pivotal connection thereto. Thus, the tube can be given any desired cross-sectional shape including, particularly, a circular one.

A further feature of the invention resides in the mounting of one coupling element of an associated transmission system, controlled by the outer tube of the column, on the scissor linkage rather than the tube itself. This coupling element may, for example, be a gear segment replacing the rack of the conventional rack-and-pinion arrangement, the segment being advantageously positioned on a pivot shaft rigid with the aforementioned second arm of the linkage and located at the fixed fulcrum thereof. This construction completely isolates the coupling element from the outer tube with reference to any residual angular displacement of the latter. It will be apparent, however, that some of the advantages of my invention are also realizable with other types of coupling, e.g. with a push rod or equivalent link anchored to a lug on the outer tube.

The above and other objects, features and advantages of the present invention will become more fully apparent from the following detailed description, reference being made to the accompanying drawing in which.

Figure 4:
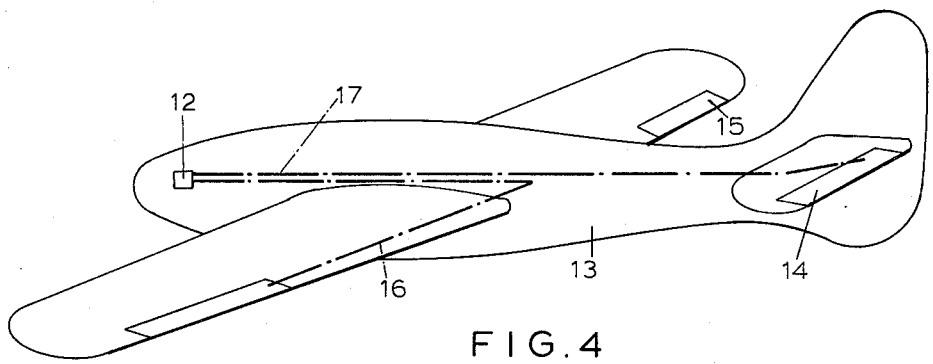
FIG. 4 is a somewhat diagrammatic view of an aircraft incorporating an assembly as shown in the preceding figures.

Reference will first be made to FIG. 4 which shows a control-column assembly 12 at the pilot's or copilot's position in the control cabin of an aircraft 13. The elevator and the ailerons of the craft, respectively designated 14 and 15, are connected with the control system 12 by mechanical or electrical links indicated schematically at 16 and 17.

Figure 1:
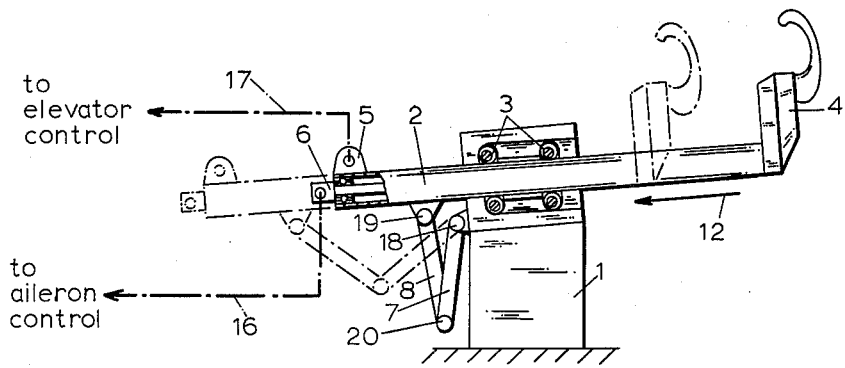
FIG. 1 is a side-elevational view of a control-column assembly embodying the invention.

In the system of FIG. 1 the outer tube 2 of the control column 18 is reciprocably mounted in a pillow block 1 by rollers 3 forming a pair of axially spaced bearings therefor. A hand wheel 4 is attached to one end of the inner rod 6 of the control column. The rod 6 is held against relative axial displacement in the tube 2 but is free to rotate therein to actuate the aileron linkage 16. Any axial motion imparted to it by wheel 4 entrains the tube 2 and thereby drives the elevator-control system by means of a lug 5 and a push rod or the like, the latter forming part of the link 17 schematically shown connected to this lug. An arm 7 is pivotally attached to the pillow block 1 at 18 and another arm 8 is similarly joined at 19 to the tube 2. The two arms 7, 8 are articulated together at a hinge 20 to form a scissor linkage.

FIG. 1 shows the extended and retracted positions of the control columns 2, 6 in solid and phantom lines, respectively; the arms 7, 8 swing in a common axial plane of the columns 2, 6 and prevent any rotation of the tube 2, which is cut from cylindrical stock, in its bearings 3.

Figure 2:
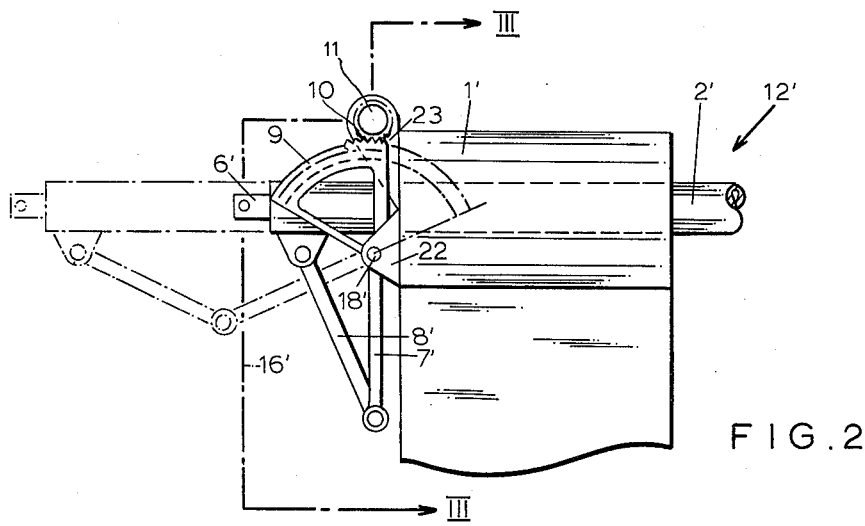
FIG. 2 is a similar view of a modified embodiment.
Figure 3:
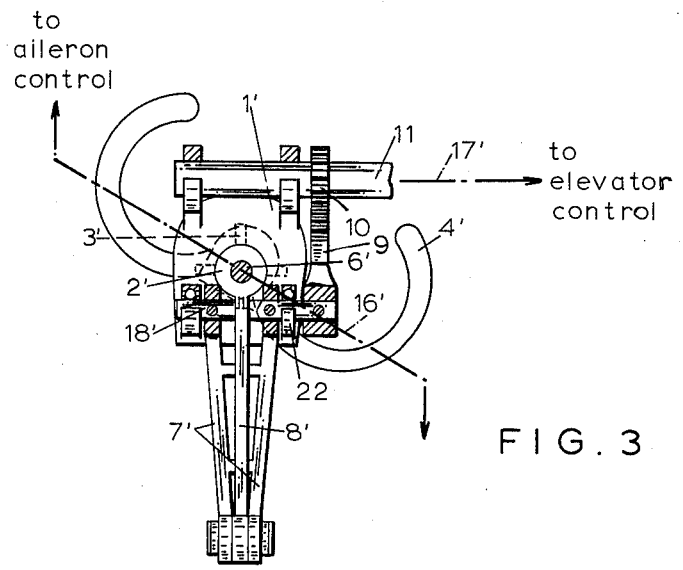
FIG. 3 is a cross-sectional view taken on the line III—III of FIG. 2.

FIGS. 2 and 3 show a modified control unit in which the coaxial members 2' and 6' of the column, reciprocally guided in pillow block 1' are similar to the members 2 and 6 of FIG. 1 except for the omission of the lug 5. Instead, the pivot shaft 18' at the fixed fulcrum of scissor arm 7' has been extended laterally and carries, on its extremity projecting beyond one of the mounting lugs 22 of block 1', a gear segment 9 which meshes with a pinion 10 on a shaft journaled in mounting lugs 23 on the same block. Shaft 11 forms part of the linkage 17' extending to the elevator-control system of the aircraft. Segment 9, driven in response to axial displacement of tube 2' via the scissor linkage 7' and 8', translates this linear motion of the tube into an angular movement of shaft 11. The accurate meshing between segment 9 and pinion 10 is unaffected by any twisting of the tube 2' in its bearing 3'. Wheel 4' and rod 6' have been shown swung out of their normal angular position to illustrate the manner in which this rod acts upon its linkage 16'.

My invention is, of course, not limited to the specific embodiments described and illustrated. In particular, the scissor linkage 7, 8 or 7', 8' may be anchored to the tube 2 or 2' at locations other than those shown and to the airframe at some stationary part other than the pillow block 1 or 1'. These and other modifications readily apparent to persons skilled in the art are intended to be embraced in the scope of the invention as defined in the appended claims.

I claim:

1. A control assembly for the ailerons and elevators of an aircraft, comprising a tubular outer member, and an elongated inner member nested in said outer member with freedom of relative rotation but held therein against relative axial displacement, a fixed support for said members including bearing means slidably accommodating said outer member, said inner member having an extremity projecting from said outer member, operating means on said extremity for rotating said inner member and axially reciprocating both said members, a first arm pivotally secured to said outer member, a second arm swingable about a fulcrum fixedly positioned relatively to said support, said arms being hingedly interconnected for swinging motion in substantially the same plane, thereby preventing rotation of said outer member relative to said support, and a pair of connecting means extending from said outer and inner members to said elevators and said ailerons, respectively, one of said connecting means comprising a first coupling element displaceable by said outer member and a second coupling element engaged by said first coupling element, said one of said connecting means including a pivot shaft at said fulcrum rigid with said second arm, said first coupling element being mounted on said pivot shaft, said first coupling element being constituted as a gear segment, said second coupling element having teeth meshing with those of said gear segment.

2. An assembly according to claim 1 wherein said bearing means comprises a set of rollers peripherally spaced about said outer member.

3. A control column for an aircraft, comprising a tubular outer member, an elongated inner member nested in said outer member with freedom of relative rotation but held therein against relative axial displacement, a fixed support for said members including bearing means slidably accommodating said outer member, said inner member having an extremity projecting from said outer member, a hand wheel on said extremity for rotating said inner member and axially reciprocating both said members, a first arm pivotally secured to said outer member, a second arm swingable about a fulcrum fixedly positioned relatively to said support, said arms being hingedly interconnected in a scissor linkage for swinging motion in substantially the same plane, thereby preventing rotation of said outer member relative to said support, elevator-control means operatively connected with said outer member, aileron-control means operatively connected with said inner member, said elevator-control means comprising a gear segment and a pinion meshing therewith, and a pivot shaft at said fulcrum rigid with said second arm, said gear segment being mounted on said pivot shaft.

4. A control assembly for the ailerons and elevators of an aircraft, said assembly comprising a tubular outer member, an elongated inner member nested in said outer member with freedom of relative rotation but held therein against axial displacement relatively thereto, a fixed support for said members including bearing means slidably accommodating said outer member, said inner member having an extremity projecting from said outer member, operating means on said extremity for rotating said inner member and axially reciprocating both said members, a first arm pivotally secured to said outer member, and a second arm swingable about a fulcrum fixedly positioned relatively to said support, said arms being hingedly connected in a toggle linkage for swinging motion in substantially the same plane, thereby preventing rotation of said outer member relative to said support, the other extremity of said inner member being provided with a connecting means for transmission of rotary movement to the aileron control, one of said arms being provided remote from the hinge connecting it with the other arm with an axle rotatable with said one of said arms and operatively connecting it with said elevators.

5. An assembly according to claim 4 wherein said axle is provided with a toothed segment rotatable therewith, said assembly further comprising a pinion meshing with said segment, and a shaft rotatably connected with said pinion for operating said elevator.

6. An assembly according to claim 5 wherein said axle constitutes a pivot shaft forming the fixed fulcrum of said second arm.

References Cited by the Examiner
UNITED STATES PATENTS

| | | | |
|---|---|---|---|
| 2,539,753 | 1/51 | Peterson | 244—83 |
| 2,549,969 | 4/51 | Hesemann | 74—471 |
| 2,943,498 | 7/60 | Smith | 74—520 X |
| 2,991,963 | 7/61 | Peterson | 74—471 X |

BROUGHTON G. DURHAM, *Primary Examiner.*